(12) United States Patent
Minegishi et al.

(10) Patent No.: US 10,676,104 B2
(45) Date of Patent: *Jun. 9, 2020

(54) DRIVING ASSIST DEVICE

(71) Applicant: Mazda Motor Corporation, Aki-gun, Hiroshima (JP)

(72) Inventors: Yuka Minegishi, Hatsukaichi (JP); Keiichi Tomii, Hiroshima (JP); Yasutaka Kajiwara, Hiroshima (JP); Takahiro Tochioka, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,079

(22) Filed: Nov. 20, 2018

(65) Prior Publication Data

US 2019/0161093 A1    May 30, 2019

(30) Foreign Application Priority Data

Nov. 24, 2017  (JP) ................. 2017-225580

(51) Int. Cl.
| | |
|---|---|
| *B60W 50/14* | (2020.01) |
| *B60W 50/10* | (2012.01) |
| *G06F 3/01* | (2006.01) |
| *G06K 9/00* | (2006.01) |

(52) U.S. Cl.
CPC ............ *B60W 50/14* (2013.01); *B60W 50/10* (2013.01); *G06F 3/013* (2013.01); *G06K 9/00791* (2013.01); *G06K 9/00845* (2013.01); *B60W 2050/146* (2013.01)

(58) Field of Classification Search
CPC .................................. G06K 1/00; B60W 10/00
See application file for complete search history.

(56) References Cited

U.S. PATENT DOCUMENTS

| | | | |
|---|---|---|---|
| 9,925,872 B1* | 3/2018 | Alasry | B60W 50/12 |
| 2010/0268453 A1 | 10/2010 | Otani et al. | |
| 2013/0116919 A1* | 5/2013 | Furuhata | G01C 21/3629 |
| | | | 701/408 |
| 2018/0141570 A1* | 5/2018 | Kimura | B60W 50/14 |
| 2019/0300002 A1* | 10/2019 | Fung | G06K 9/00536 |

FOREIGN PATENT DOCUMENTS

| | | |
|---|---|---|
| JP | 2009128210 A | 6/2009 |
| JP | 2010190733 A | 9/2010 |
| JP | 2013250663 A | 12/2013 |
| JP | 2016045681 A | 4/2016 |
| WO | 2016166791 A | 10/2016 |

\* cited by examiner

*Primary Examiner* — Shirley Lu
(74) *Attorney, Agent, or Firm* — Alleman Hall Creasman & Tuttle LLP

(57) ABSTRACT

A driving assist device is provided, which includes a processor configured to execute an inference module to infer that a timing of a line-of-sight movement or blink detected by a camera near a predicted timing is a timing of a recognizing action of a driver for a subsequent travel segment of a plurality of travel segments that constitute a traveling course of a vehicle, an information providing module to provide the driver with assisting information for the subsequent travel segment before the timing of the recognizing action inferred by the inference module, and a providing timing changing module to change a providing timing of the assisting information according to a quantity of the assisting information.

3 Claims, 10 Drawing Sheets

| CANDIDATES OF INFORMATION TO BE FURTHER SHOWN | ADVANCE TIME |
|---|---|
| STORE INFORMATION AROUND COURSE | 0.1s |
| SPEED LIMIT INFO | 0.1s |
| ACCIDENT FREQUENTLY OCCURRING SECTION INFO | 0.1s |
| PARKED VEHICLES ON ROAD SHOULDER | 0.2s |
| PEDESTRIANS | 0.2s |

FIG. 6

| CANDIDATES OF INFORMATION TO BE FURTHER SHOWN | ADVANCE TIME |
|---|---|
| STORE INFORMATION AROUND COURSE | 0.1s |
| SPEED LIMIT INFO | 0.1s |
| ACCIDENT FREQUENTLY OCCURRING SECTION INFO | 0.1s |
| PARKED VEHICLES ON ROAD SHOULDER | 0.2s |
| PEDESTRIANS | 0.2s |

FIG. 7

| CANDIDATES OF INFORMATION TO BE FURTHER SHOWN | INFORMATION PROVIDING METHOD | ADVANCE TIME |
|---|---|---|
| STORE INFO AROUND COURSE | SCREEN | — |
| SPEED LIMIT INFO | SCREEN | — |
| ACCIDENT FREQUENTLY OCCURRING SECTION INFO | SOUND | |
| PARKED VEHICLES ON ROAD SHOULDER | SOUND | 0.2S |
| PEDESTRIANS | SOUND | |

FIG. 8

DRIVING ASSIST DEVICE

TECHNICAL FIELD

The present disclosure relates to a driving assist device.

BACKGROUND OF THE DISCLOSURE

A driver of a vehicle typically recognizes various situations in an upcoming driving scene (e.g., going straight, navigating a curve, a right turn, a left turn, a junction, etc.) according to a change in the road situation, judges what kind of driving operation should be performed based on the recognition, and performs a driving operation based on the judgment result. The recognition, judgment, and driving operation are frequently performed during traveling.

The judgment based on the recognizing action and recognition for the upcoming driving scene uses a significantly large amount of driving resources of the driver (i.e., increasing a driving load). JP2013-250663A discloses a device which provides, when a driving scene is changed, information according to a driving scene after the change.

It may be desirable to provide the driver with assisting information for the upcoming driving scene in advance, when reducing the amount of driving resources used at a timing of the recognizing action. However, if the providing timing of the assisting information for the upcoming driving scene is not suitable, it may cause a problem such as the driver not being able to fully understand the assisting information, and thereby some kind of measures are desired.

SUMMARY OF THE DISCLOSURE

The present disclosure is made in view of the above situations, and one purpose thereof is to provide a driving assist device which is capable of providing assisting information for a subsequent travel segment at a suitable timing.

According to one aspect of the present disclosure, a driving assist device is provided, which includes a processor configured to execute an inference module to infer that a timing of a line-of-sight movement or blink detected by a camera near a predicted timing is a timing of a recognizing action of a driver for a subsequent travel segment of a plurality of travel segments that constitute a traveling course of a vehicle, an information providing module to provide the driver with assisting information for the subsequent travel segment before the timing of the recognizing action inferred by the inference module, and a providing timing changing module to change a providing timing of the assisting information according to a quantity of the assisting information.

According to this configuration, by providing the assisting information for the subsequent travel segment in advance before entering to the subsequent travel segment, a burden on the driver for the recognition of the subsequent travel segment can be reduced. Further, by changing the providing timing of the assisting information according to the quantity of the assisting information, the assisting information can be provided to the driver at a suitable timing whereby the situation in which the providing timing of the assisting information is too late or too early is avoided.

The information providing module may shift the providing timing earlier according to an increase in the quantity of the assisting information.

In this case, even when the quantity of information is large which typically requires time to understand, the driver can understand the assisting information which is provided earlier.

The information providing module may restrict an earlier shift of the providing timing by suspending an increase in the quantity of the assisting information to be provided.

This is advantageous in avoiding a situation in which the driver feels annoyed by being provided the assisting information too early.

The assisting information may include navigational information for the subsequent travel segment, a degree of danger in a traffic environment, and other information. The information providing module may suspend the providing of other information prior to the navigational information for the subsequent travel segment and the degree of danger in the traffic environment.

In this case, the assisting information in which route information and safety-related information are prioritized can be provided.

BRIEF DESCRIPTION OF DRAWINGS

FIG. 6 is a table illustrating examples of a plurality of types of assisting information to be provided and advance times of the assisting information.

FIG. 7 is a table illustrating examples of the assisting information which are reduced among the plurality of types of assisting information illustrated in FIG. 6.

FIG. 8 is a table illustrating examples of the assisting information which are provided by screen display, and the assisting information provided by sound.

DETAILED DESCRIPTION OF THE DISCLOSURE

Figure 1:
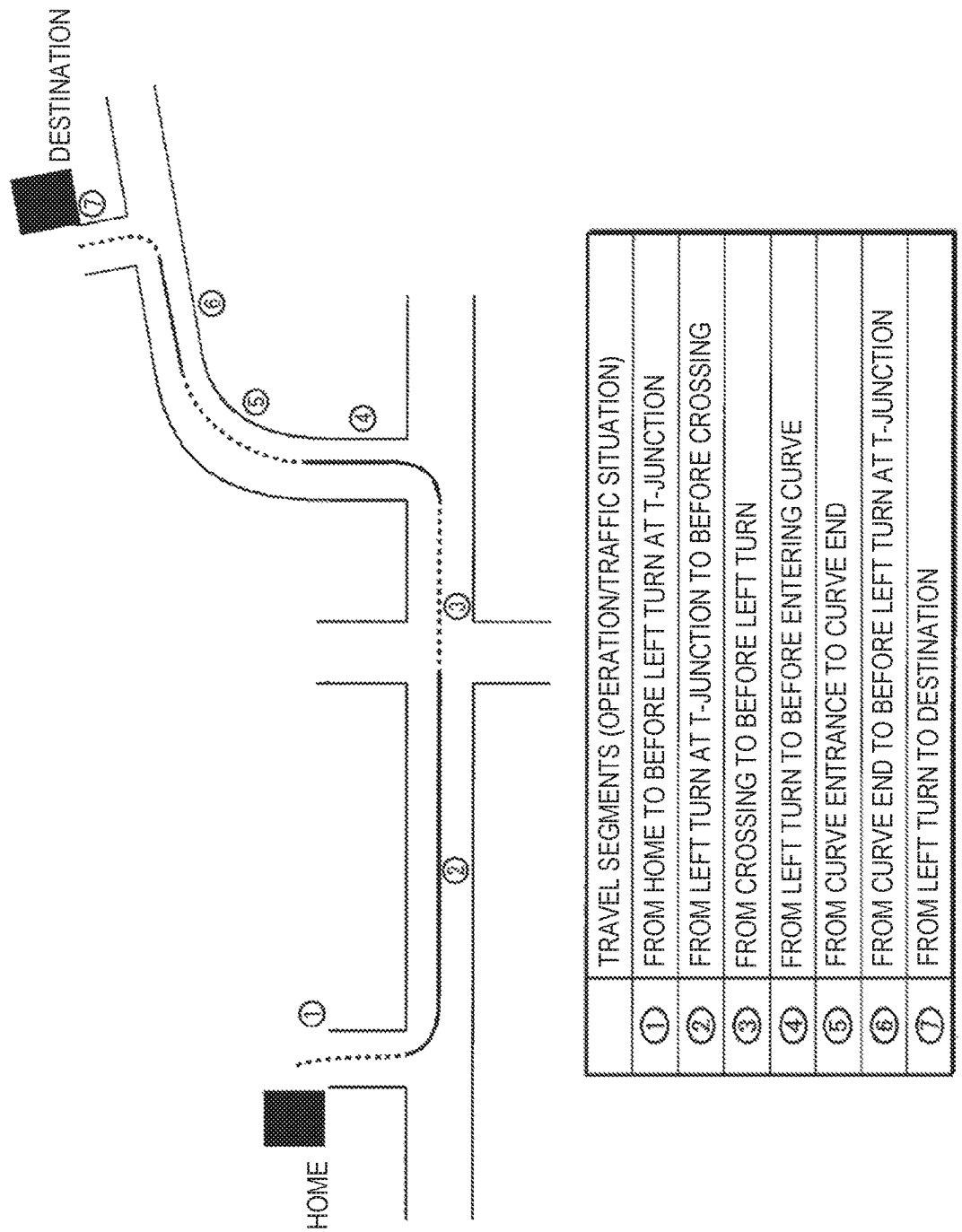
FIG. 1 is a view illustrating a simplified example of a situation where a travel segment is changed.

First, one example of a situation where a driving scene (travel segment) is changed is described using FIG. 1. In this figure, squares indicate home as a starting point and a destination. A vehicle (hereinafter, referred to as "the vehicle" so as to be distinguished from other vehicles) is to travel along a course which is set by a navigation device from the home to the destination. In the traveling course, there are seven kinds of travel segments O1-O7. Here, "O1" corresponds to the circled numeral "1," and O2, O3, etc.

correspond to similar circled numerals). Meanings of the travel segments O1-O7 are collectively indicated in a lower part of FIG. 1 as a table.

Figure 2:
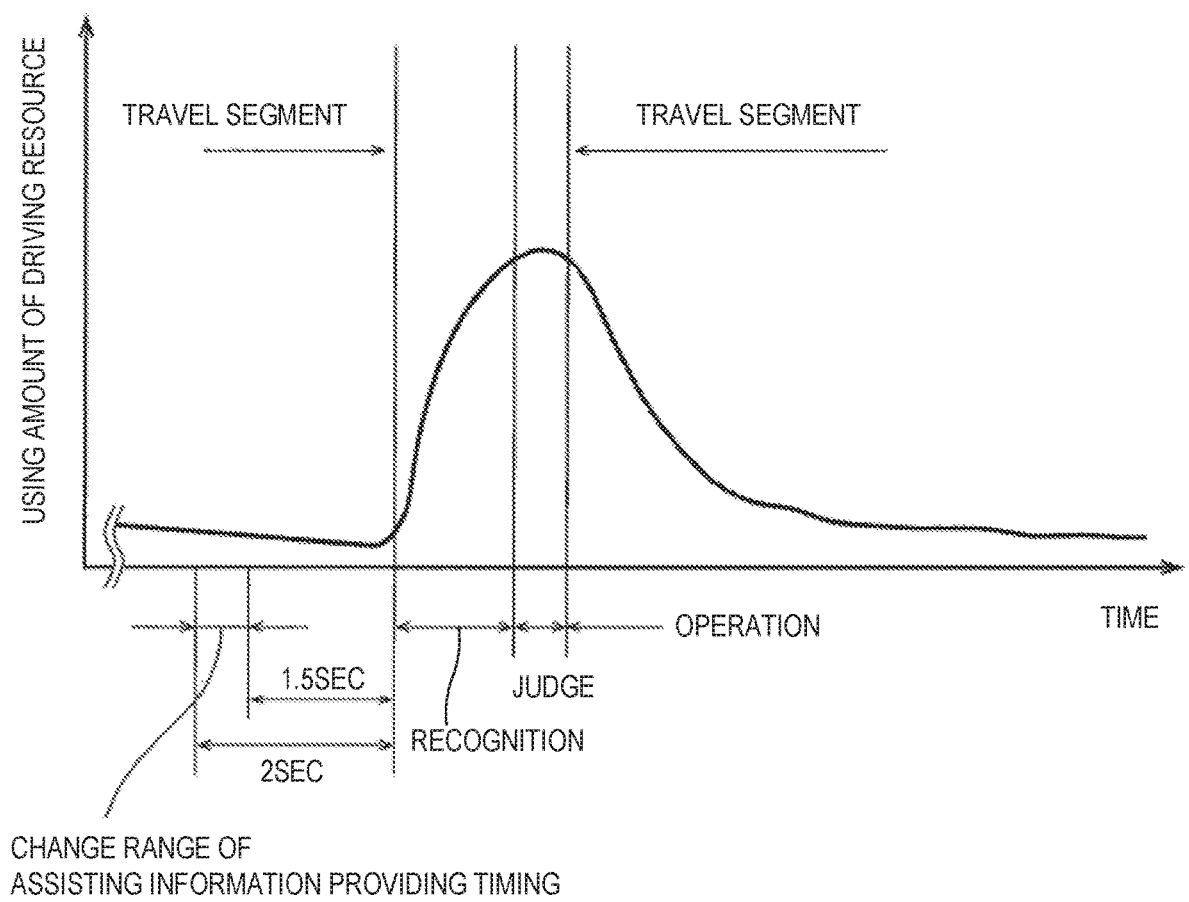
FIG. 2 is a graph illustrating a relationship between an action pattern which a driver performs for a subsequent travel segment and an amount of driving resource used, and an assisting information providing timing.

FIG. 2 illustrates, when the driving scene is changed from the current travel segment to the subsequent travel segment, a relationship between a recognizing action which a driver performs in preparation for the subsequent travel segment, and an amount of driving resource used at the timing of the travel segment change. Note that the driver's driving load increases as the amount of driving resource used increases.

The driver first performs a recognizing action before the subsequent travel segment. This recognizing action is an action to recognize a variety of information, such as traffic in the subsequent travel segment, a road structure (e.g., a road width, complexity of a road intersection or junction), weather, traffic participants (e.g., pedestrians, bicycles), a traveling state (e.g., an inter-vehicle distance from the vehicle to another vehicle), and vehicle performance (e.g., brake performance).

The driver judges how he/she will operate the vehicle based on the recognition, and then performs the judged driving operation. Therefore, if the driver is able to promptly recognize the situation in the subsequent travel segment, his/her burden for the recognition can significantly be reduced, and thereby the driver can perform the driving operation with affordable time. Particularly, since the amount of driving resource used increases in a range where the recognition and judgment are made, it will become very desirable if the driver is fed or provided with the assisting information for the subsequent travel segment before he/she performs the recognizing action.

The providing timing of the assisting information for the subsequent travel segment is as follows in this embodiment. That is, in FIG. 2, a basic providing timing is a timing before a given time (in this embodiment, 1.5 seconds before) of the timing (start timing) of the driver's recognizing action for the subsequent travel segment. In addition, the assisting information may be provided earlier than 1.5 seconds before which is the basic providing timing, according to the contents, quantity, and providing method of the assisting information provided. However, in this embodiment, the providing of the assisting information is not configured to be performed earlier than a given time (in this embodiment, 2 seconds) of the timing of the recognizing action so that the driver can avoid the annoyance caused by being provided with the assisting information too early.

Figure 3:
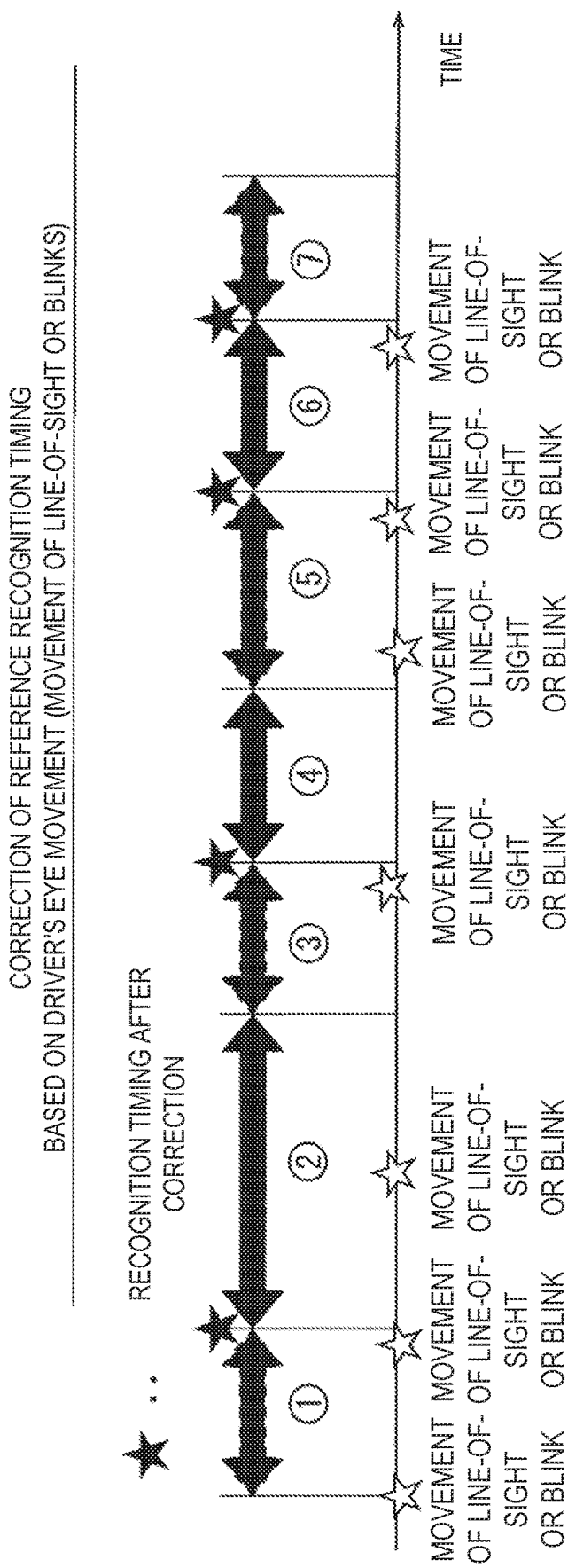
FIG. 3 is a timing chart illustrating a situation of correcting a timing of a recognizing action which is used as a reference.

FIG. 3 illustrates a basic setup of the timing at which the recognizing action is performed and its correction, when the travel segment is changed as illustrated in FIG. 1. That is, the timing at which the driver will perform the recognizing action is automatically predicted beforehand based on route information, and the automatically-predicted timings are indicated by white stars in this figure.

When the driver actually performs the recognizing action, he/she typically moves his/her line of sight or blinks. Therefore, it can be inferred that the timing of the line-of-sight movement or blink is detected near the automatically-predicted timing is a timing of the recognizing action for the subsequent travel segment. The inferred timing of the recognizing action may be stored beforehand as data, together with relational information indicative of a relationship between a certain travel segment and a subsequent travel segment. Thus, as for a past-traveled course, the timing of the recognizing action which the driver performs can be inferred with sufficient accuracy. In FIG. 3, although the line-of-sight movement or blink is detected in the travel segment O2, since it is a timing largely separated from the timing of the recognizing action for the subsequent travel segment, the detected timing is not determined as the timing of the recognizing action (a state in which the driver recognizes the travel segment O3 in addition to the travel segment O2 by the recognizing action for the travel segment O2).

Figure 4:
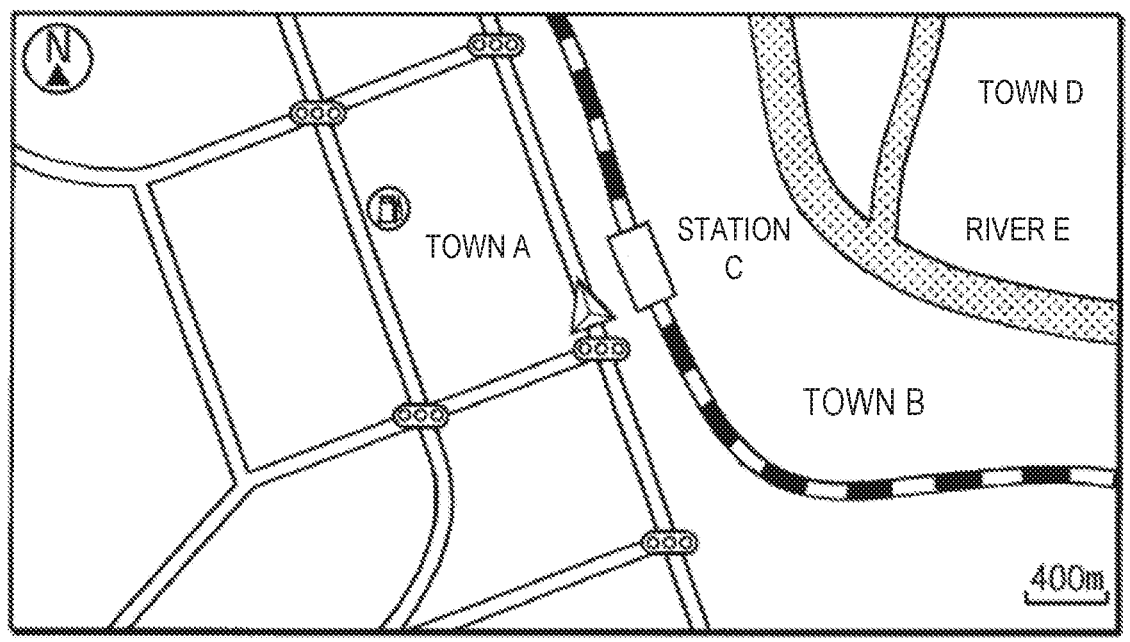
FIG. 4 is a view illustrating one example of a map near a vehicle, which is displayed on a navigation screen.
Figure 5:
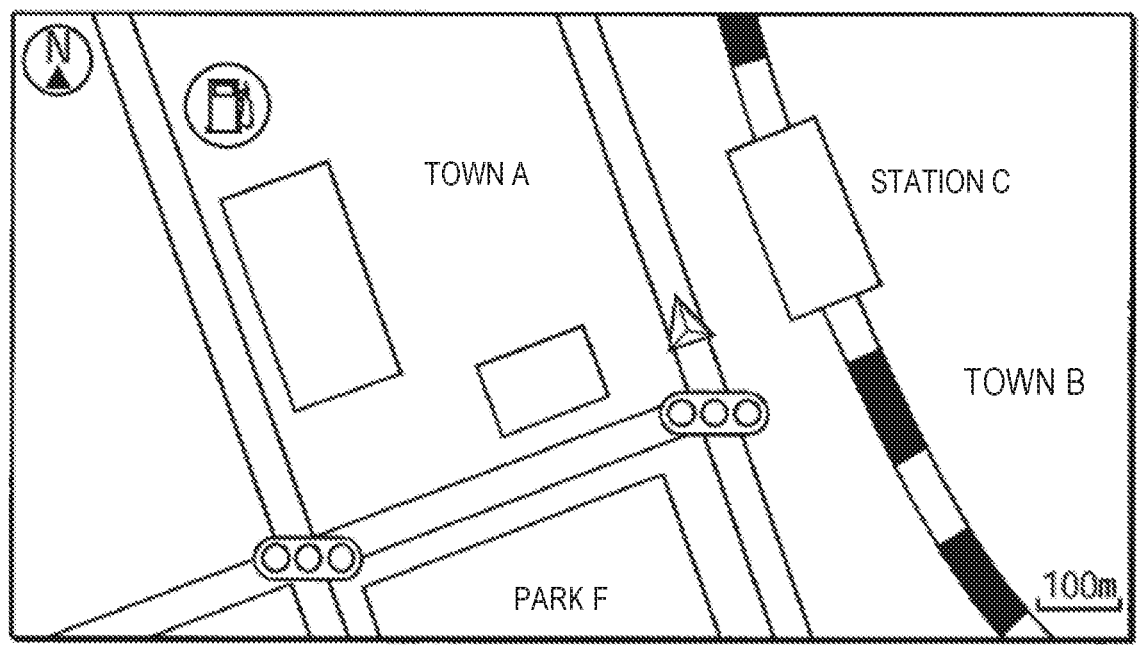
FIG. 5 is a view illustrating one example where the map illustrated in FIG. 4 is displayed in detail for the subsequent travel segment.

The assisting information provided for the subsequent travel segment includes at least the detailed display of the map in the subsequent travel segment (at an initial timing of the travel segment). That is, FIG. 4 illustrates map information displayed on a display screen of the navigation device in the current travel segment. The map information as the assisting information for the subsequent travel segment is expanded from the state of FIG. 4 (detailed display of FIG. 5).

The assisting information provided for the subsequent travel segment may be information as illustrated in FIG. 6 other than the map information. That is, first assisting information is store information around the course (in this embodiment, stores are limited to types to be provided which are selected beforehand by the driver), and in this case, the store information is provided 0.1 second earlier than the basic providing timing.

Second assisting information is a speed limit set for the subsequent travel segment, and in this case, it is provided 0.1 second earlier than the basic providing timing. Third assisting information is accident frequently occurring section information on the subsequent travel segment, and in this case, it is provided 0.1 second earlier than the basic providing timing. Fourth assisting information is information related to (existence of) parked vehicles on a road shoulder in the subsequent travel segment, and in this case, it is provided 0.2 seconds earlier than the basic providing timing. Fifth assisting information is information related to pedestrians in the subsequent travel segment (particularly, pedestrians who are moving toward the road in the subsequent travel segment), and in this case, it is provided 0.2 seconds earlier than the basic providing timing.

If a plurality of types of assisting information among the first to fifth assisting information are provided, a period of time obtained by summing the respective advance times is the total advance time from the basic providing timing. For example, when the speed limit information and the pedestrian information are provided, 0.3 seconds obtained by adding 0.1 second and 0.2 seconds is added to 1.5 seconds, and thus, the assisting information is finally provided 1.8 seconds earlier (all of the assisting information is provided 1.8 seconds earlier).

If the quantity of assisting information illustrated in FIG. 6 increases, "the sum total time of the advance time of the basic providing timing plus other advance times" may exceed 2 seconds. In this case, the assisting information is provided in a state where the assisting information other than the route information (navigational information such as the map display of FIG. 5) and danger in a traffic environment (the accident frequently occurring section information, the parking information, and the pedestrian information on the road shoulder in FIG. 6) is omitted. That is, at least one of the store information around the course and the speed limit information in FIG. 6 is omitted. In FIG. 7, this state is illustrated where the store information around the course and the speed limit information are omitted.

FIG. 8 illustrates an example setup where the assisting information being provided by screen display and by sound are distinguished from each other. The kinds of assisting information are the same as the case of FIG. 6, where the store information around the course and the speed limit information are provided by screen display, and three other kinds of assisting information are provided by sound. Since providing the assisting information by sound gives the driver a more intensive notification as compared with providing by screen display, it may be desirable to provide the assisting information indicative of the danger in traffic environment by sound.

Note that, in the case of screen display, any types of display screen may be adopted. For example, a display screen for the navigation device may be used (the assisting information is displayed together with the map information), a display screen provided separately from the display screen for the navigation device may be used, or a front window shield glass which is located in front of the driver may be used as a display screen (head-up display).

Figure 9:
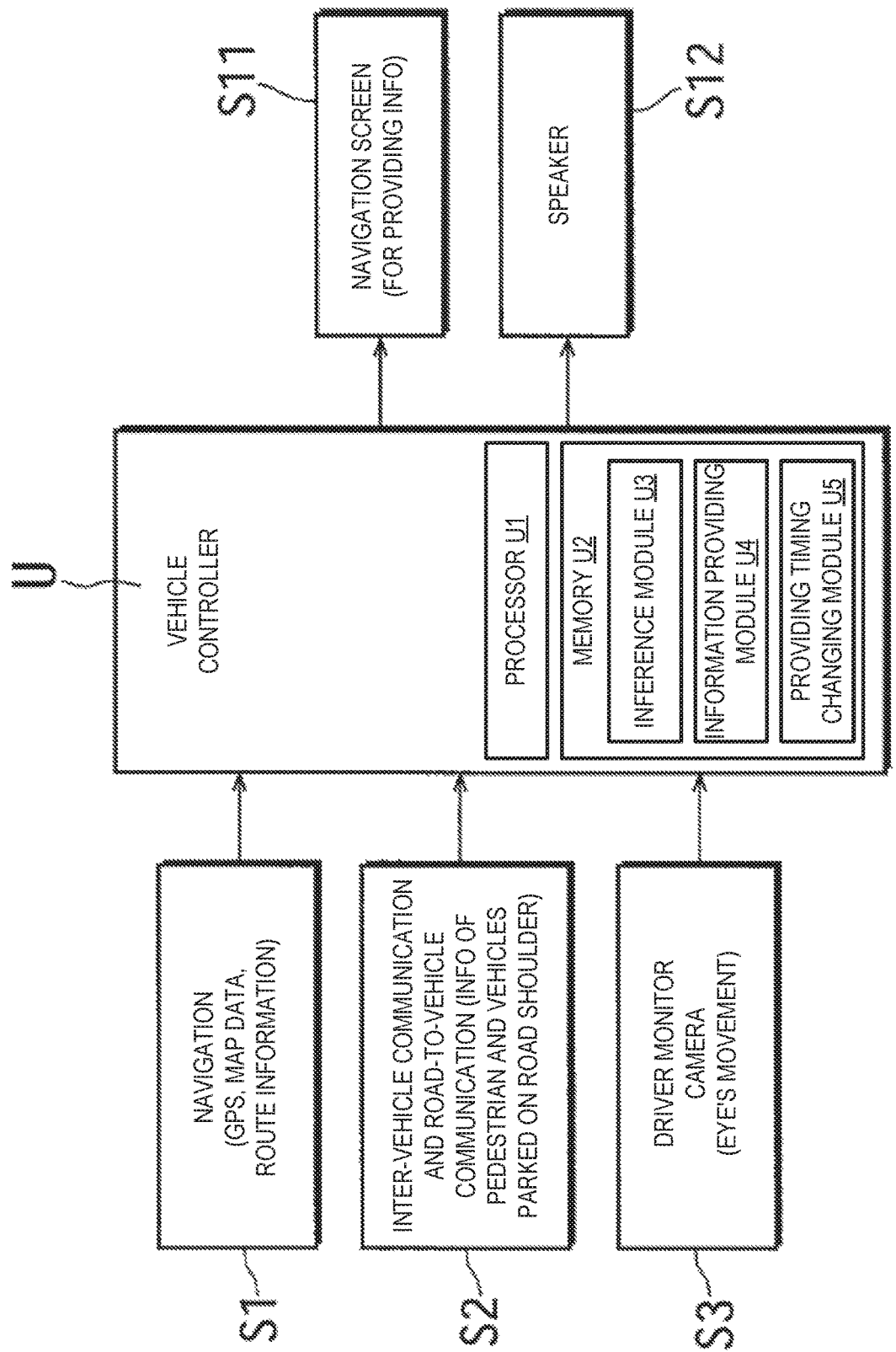
FIG. 9 is a view illustrating one example of a control system of the present disclosure.

FIG. 9 illustrates one example of a control system of the present disclosure. In this figure, U is a controller comprised of a microcomputer including a processor U1 and non-volatile memory U2. The controller U is one example of a "driving assist device." The controller U accepts signal inputs from a navigation device S1 (the map data, route information, and positional information of GPS), a communication device S2 which performs inter-vehicle communications and road-to-vehicle communications (access to information of the pedestrians and the vehicles parked on the road shoulder which exist in the subsequent travel segment), and an eye camera S3 which detects the motion of driver's eyes. Note that the detection of the driver's line of sight and/or the blink may be detected based on one or both of the driver's eyes. Moreover, the controller U controls a display screen S11 and a speaker S12 for providing the assisting information. The controller U includes an inference module U3, information providing module U4, and providing timing changing module U5 which are stored in the memory U2 as software and executed by the processor U1 to perform their respective functions.

Figure 10:
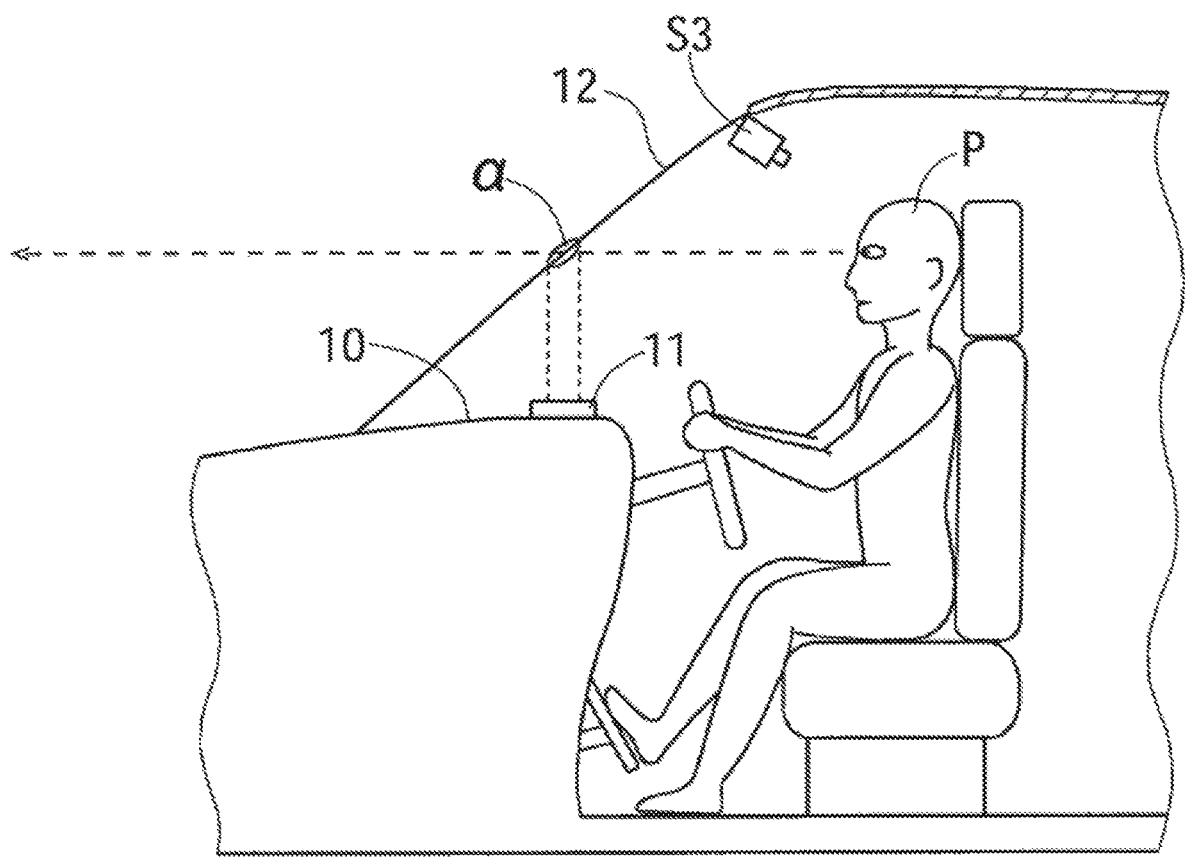
FIG. 10 is a view illustrating one example of mounting an eye camera etc. to the vehicle.

FIG. 10 illustrates an example layout of the eye camera S3, etc. illustrated in FIG. 9 to the vehicle. In this figure, P is the driver, and the eye camera S3 which is directed toward the position of the driver's eyes is disposed at an upper front location of the driver (e.g., near a rearview mirror). Moreover, the display screen for the navigation device is fundamentally used as the display screen S11. In FIG. 10, a projector 11 of a head-up display is disposed on an upper surface of an instrument panel 10, and the position of the assisting information which is displayed (projected) on a front window shield glass 12 by the projector 11 is illustrated by a. Note that it may be possible by changing the height of the displayed position a to guide the line of sight of the driver P (e.g., the line of sight of the driver P is guided toward a more distant location as the displayed position a becomes higher).

Next, one example of a control to provide the assisting information by the controller U is described. Note that in this example control, the timing of the recognizing action is automatically set according to the course during traveling, the automatically-set timing of the recognizing action is corrected based on the line-of-sight movement or blink of the driver's eye, and the corrected timing of the recognizing action is stored in (the memory U2 of) the controller U. Moreover, Q indicates a step in the following description.

First, at Q1, the controller U reads the map information and the route information (e.g., the course from the home to the destination illustrated in FIG. 1). At Q2, the controller U determines whether a traveling history exists. If YES at the determination of Q2, i.e., if the vehicle has traveled the same course in the past, the controller U transits at Q3 to Q11 in FIG. 12 after reading the timing of the recognizing action for the subsequent travel segment stored upon the past traveling.

If NO at the determination of Q2, i.e., if the vehicle is traveling this course for the first time, the controller U automatically sets the timing of the recognizing action based on the route information at Q4. Then, at Q5, the controller U starts processing for newly acquiring and storing the timing of the recognizing action as will be described later. After this, the controller U transits to Q11 in FIG. 12.

Figure 12:
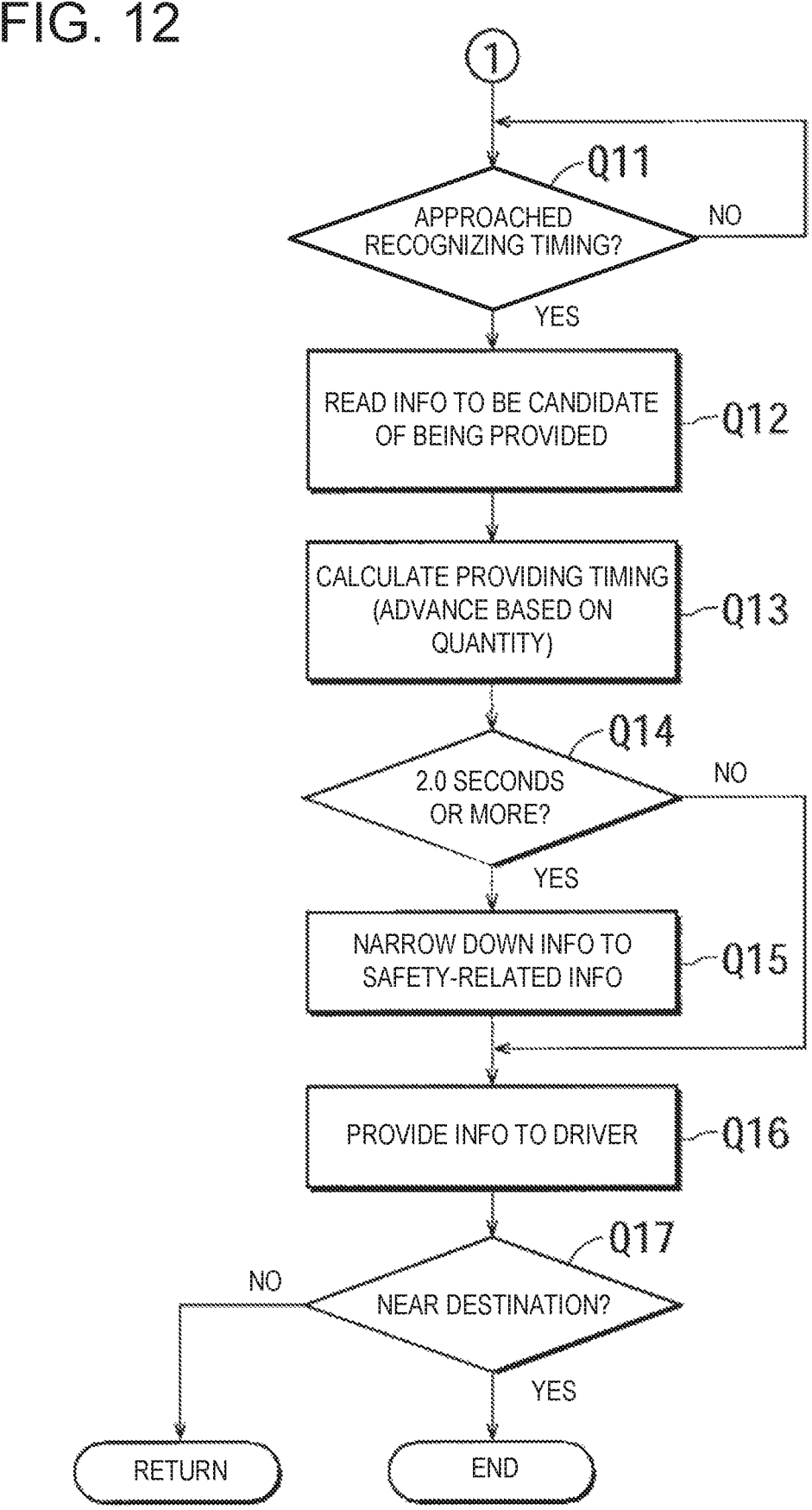
FIG. 12 is a flowchart illustrating one example of the control of the present disclosure.

After Q3 or Q5, the controller U transits to Q11 in FIG. 12. At Q11, the controller U determines whether it has approached the timing of the recognizing action. If NO at the determination of Q11, the controller U repeats the processing of Q11. If YES at the determination of Q11, the controller U reads (detects) at Q12 the assisting information to be provided. Then, the controller U calculates the providing timing of the assisting information at Q13.

After Q13, the controller U determines at Q14 whether the providing timing calculated at Q13 is 2 seconds or more before the timing of the recognizing action for the subsequent travel segment. If NO at the determination of Q14, the controller U provides the assisting information at Q16 because the providing timing is not too early. Of course, this providing timing of the assisting information at Q16 is the timing set at Q13.

On the other hand, if YES at the determination of Q14, the controller U deletes the information other than the safety-related information among the assisting information determined to be provided at Q15, and processes so that the timing before the timing of the recognizing action is within 2 seconds as described above. Then, the controller U transits to Q16.

After Q16, the controller U determines whether the vehicle is near the destination at Q17. If NO at the determination of Q17, the controller U returns to Q1. If YES at the determination of Q17, the controller U ends the control.

Figure 11:
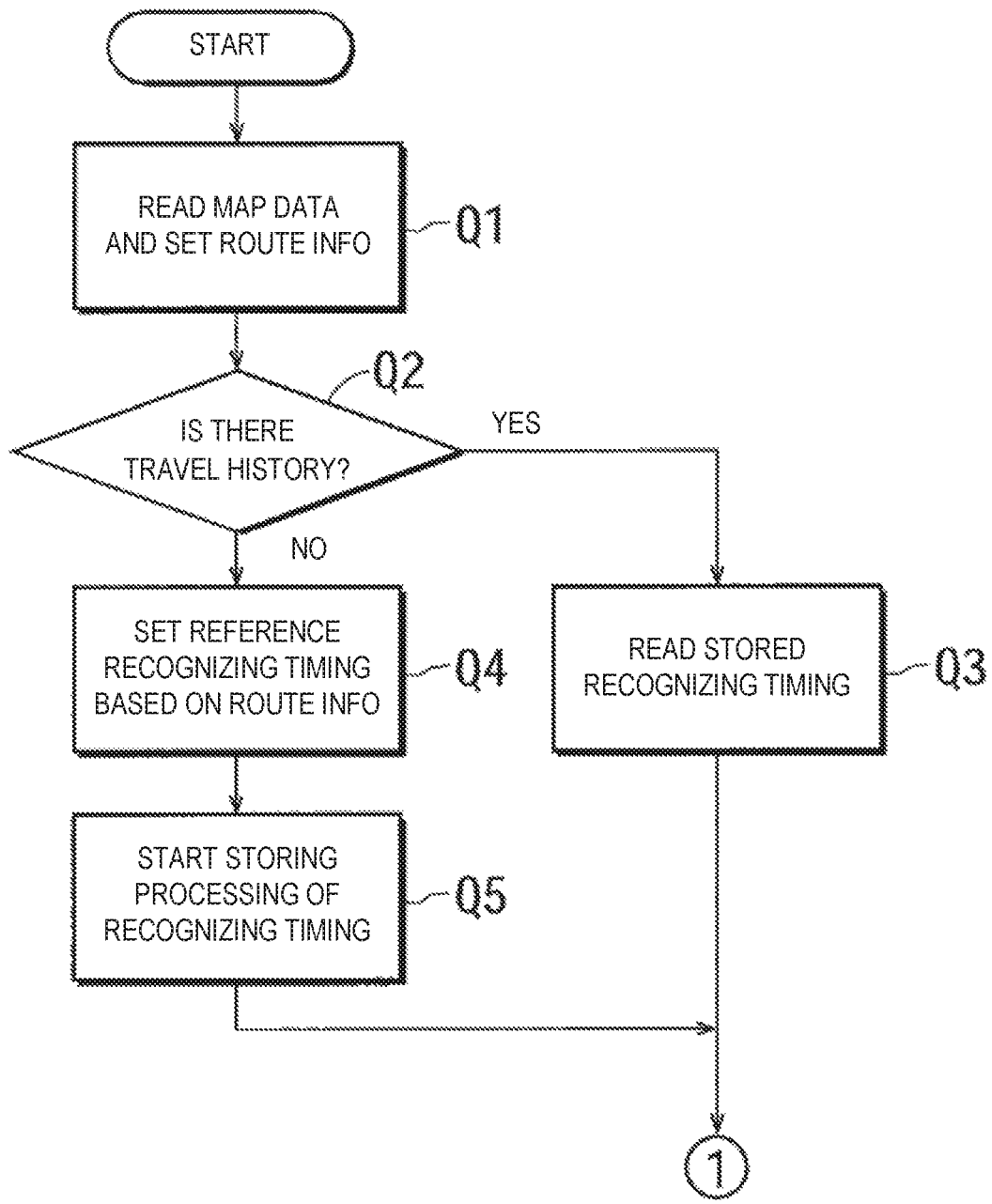
FIG. 11 is a flowchart illustrating one example of control of the present disclosure.
Figure 13:
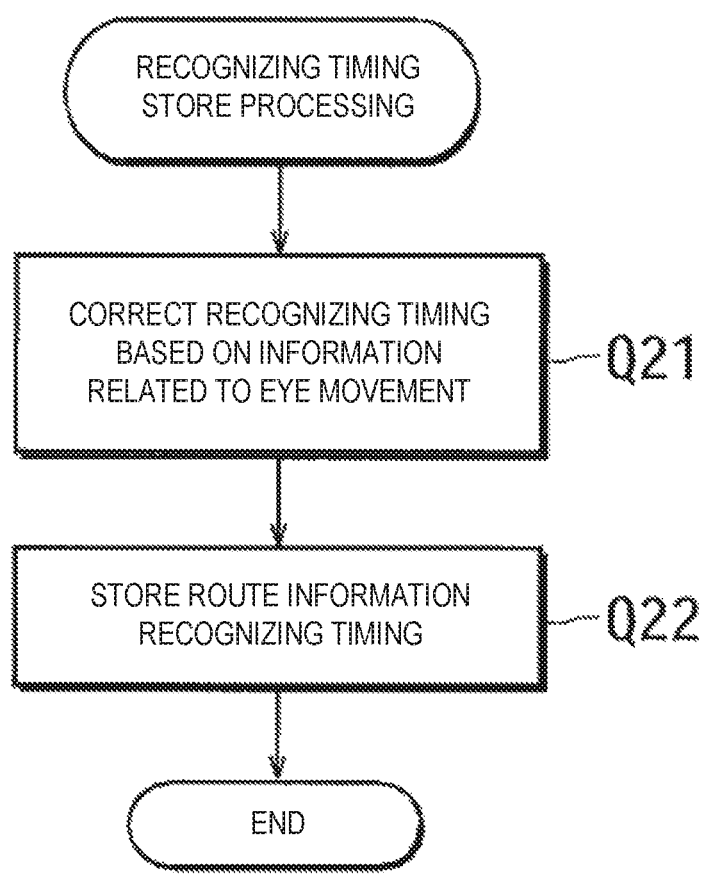
FIG. 13 is a flowchart illustrating one example of control of the present disclosure.

FIG. 13 illustrates one example processing of Q5 in FIG. 11. That is, at Q21, the timing of the driver's recognizing action is corrected based on the line-of-sight movement or blink of the driver near the timing of the recognizing action automatically set in accordance with the course. Then, at Q22, the corrected timing of the recognizing action is stored in (the memory U2 of) the controller U. Upon storing, the current travel segment and the subsequent travel segment are stored so as to be associated with each other. By repeating the storing, it is possible to automatically set the timing of the recognizing action with sufficient accuracy if the road situation is similar to the stored road situation, even if the vehicle is traveling a road for the first time.

Although an embodiment is described above, the present disclosure is not limited to this embodiment and may be varied within the scope of the appended claims. For example, the inference of the timing of the recognizing action may be performed based on any suitable information relevant to the driving operation, such as a driving operation state of a driving operation instrument, such as a steering wheel, a brake pedal, and an accelerator pedal, and a physiological phenomenon caused by the driving operation, such as a change in perspiration and heart rate of the driver. Of course, the purpose of the present disclosure is not limited to those expressly described but may implicitly includes providing those expressed as substantially desirable or advantageous.

The present disclosure is desirable for reducing the driver's burden.

DESCRIPTION OF REFERENCE CHARACTERS

U: Controller
S1: Navigation Device

S2: Communication Device
S3: Eye Camera
S11: Display Screen
S12: Speaker
P: Driver
10: Instrument Panel
11: Projector (Head-up Display)
α: Projection Position

What is claimed is:

1. A driving assist device, comprising:
a processor configured to execute:
an inference module to infer that a timing of a line-of-sight movement or blink detected by a camera near a predicted timing is a timing of a recognizing action of a driver for a subsequent travel segment of a plurality of travel segments that constitute a traveling course of a vehicle;
an information providing module to provide the driver with assisting information for the subsequent travel segment before the timing of the recognizing action inferred by the inference module; and
a providing timing changing module to change a providing timing of the assisting information according to a quantity of the assisting information, wherein
the information providing module decreases the quantity of the assisting information provided to the driver responsive to detecting that the providing timing of the assisting information is at least a predetermined time length earlier than the timing of the recognizing action of the driver.

2. The driving assist device of claim 1, wherein the information providing module shifts the providing timing earlier according to an increase in the quantity of the assisting information.

3. The driving assist device of claim 1, wherein the assisting information includes navigational information for the subsequent travel segment, a degree of danger in a traffic environment, and other information, and
wherein the information providing module suspends the providing of the other information prior to the navigational information for the subsequent travel segment and the degree of danger in the traffic environment.

* * * * *